United States Patent Office 2,927,880
Patented Mar. 8, 1960

2,927,880

DIMETHYL-2,2,2-TRICHLORO-1-ACETYLOXY-ETHYL PHOSPHONATE

John E. Casida and Belton Wayne Arthur, Madison, Wis., assignors to Wisconsin Alumni Research Foundation, Madison, Wis., a corporation of Wisconsin No Drawing. Application December 17, 1956
Serial No. 628,506

2 Claims. (Cl. 167—22)

The present invention relates to the insecticide field and more specifically to a novel compound characterized by insecticidal activity and solubility in petroleum hydrocarbon distillates including relatively cheap distillates such as kerosene and the like.

The product β,β,β-trichloro-α-hydroxyethylphosphonic dimethyl ester and its preparation is described in the Lorenz Patent No. 2,701,225. This product which is known in the art as dipterex and also as Bayer L 13/59 and can be termed chemically dimethyl-2,2,2-trichloro-1-hydroxyethylphosphonate, may be represented by the following formula:

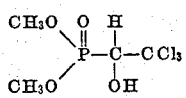

It is a potent insecticide and can be used in insecticide dusts and in relatively expensive solvents such as acetone and ethylene dichloride as described in the Lorenz patent. Its use, however, has been materially restricted due to its insolubility in petroleum hydrocarbon distillates.

In the search for improved insecticides including insecticides soluble in inexpensive petroleum hydrocarbon distillates or solvents of the kerosene type, we discovered (1) that dipterex could be readily acylated, (2) that the acylated dipterex retained its potent insecticide properties and (3) that the acylated dipterex, unlike dipterex, was soluble in petroleum hydrocarbon distillates including kerosene and the like. The novel acyloxy compound of the present invention involves the replacement of the hydroxy (OH) group at the 1-position in the ethyl group with an acyloxy, i.e. acetyloxy

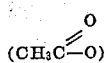

group. The following example is illustrative.

Example

About 0.1 mole of dimethyl-2,2,2-trichloro-1-hydroxyethylphosphonate is first mixed with about 0.1 mole of acetic anhydride and heated on a steam bath for about 8 hours. About 100 cc. of cold water is next added to the reaction mixture and the resulting aqueous mixture extracted twice with 100 ml. portions of hexane to recover the desired dimethyl-2,2,2-trichloro-1-acetyloxyethylphosphonate. Upon removal of the solvent by evaporation the acetylated product is obtained as an oil and displays C=O absorption but no C—OH absorption in an infrared spectrogram.

The activity of the 1-acetyloxy compound of the present inventon can be illustrated by tests where this compound at 1% level killed 71% of the Fowler strain of DDT and methoxychlor resistant houseflies in 24 hours when added to 100 mgm. of pyrethrins per 100 ml. of refined kerosene whereas DDT at 2% in a similar test using the same amounts of pyrethrins and kerosene produced only 59% mortality. Dipterex, being insoluble in kerosene, is not suitable for this method of application. When applied in acetone to flies dipterex and its acetyl derivative were about equal in toxicity.

The 1-acetyloxy compound of the present invention can be employed in solid and liquid insecticide carriers or diluents including aerosol mixtures in the same manner and in the same concentrations disclosed in the Lorenz Patent No. 2,701,225, to kill flies, roaches and the like, including DDT resistant houseflies as noted above. Unlike malathion, it is odor free and unlike dipterex, its degradation products are non-toxic. Dipterex, for example, in the presence of a trace of alkali breaks down and forms dimethyl-2,2-dichlorovinyl phosphate which is a very toxic compound. The 1-acetyloxy compound also breaks down under similar conditions but no toxic vinyl phosphate of this type is formed and the degradation products are relatively nontoxic. Tests with rats have also shown the mammalian toxicity of dipterex to be about double that of the 1-acetyloxy compound, the median lethal doses being 400 and 950 mg./kg., respectively. The reduction in the mammalian toxicity to about one-half was unexpected as the related diethyl-2,2,2-trichloro-1-acetyloxyethylphosphonate has a toxicity (about 112 mg./kg.) of the same order as the unacetylated compound.

The 1-acetyloxy compound of the present invention is particularly adaptable for dispensing in solution form in relatively inexpensive petroleum hydrocarbon distillates of the type used as diluents and carriers in the insecticide field. These include general house sprays, pressurized sprays and aerosol mixtures of which the following are illustrative.

General household spray formula:

| | Percent |
|---|---|
| Pyrethrins | .05 |
| Technical Piperonyl butoxide | 0.10 |
| 1-acetyloxy compound | 2.0 |
| Petroleum distillates | 97.85 |
| | 100.00 |

Pressurized spray formula:

| | |
|---|---|
| Pyrethrins | 0.15 |
| Technical piperonyl butoxide | 0.50 |
| 1-acetyloxy compound | 2.0 |
| Alkylated naphtha | 46.75 |
| Methylene chloride | 5.0 |
| Freon 12 (CCl$_2$F$_2$) | 45.00 |
| Deodorized kerosene | 0.6 |

Aerosol formula:

| | |
|---|---|
| Pyrethrins | .25 |
| Technical piperonyl butoxide | 1.0 |
| 1-acetyloxy compound | 2.0 |
| Petroleum distillates | 11.75 |
| Propellant [1] | 85.0 |

[1] Equal quantities of Freon-11 (CCl$_3$F) and Freon-12 (CCl$_2$F$_2$).

In the above formulations the dimethyl-2,2,2-trichloro-1-acetyloxyethylphosphonate compound of the present invention is identified by the abbreviated term "1-acetyloxy compound." Other formulations in which the 1-acetyloxy compound is applied in solution form in petroleum hydrocarbon distillates can also be employed. The 1-acetyloxy compound also has adequate water solubility for use in insecticide baits such as the sugar baits and the like.

We claim:

1. An insecticidal composition containing dimethyl-2,2,2-trichloro-1-acetyloxyethylphosphonate as an active agent and an insecticidal carrier therefor.

2. A composition in accordance with claim 1 where the carrier is a petroleum distillate.

References Cited in the file of this patent

UNITED STATES PATENTS

| | | |
|---|---|---|
| 2,536,647 | Kosolapoff | Jan. 2, 1951 |
| 2,701,225 | Lorenz | Feb. 1, 1955 |

FOREIGN PATENTS

| | | |
|---|---|---|
| 509,034 | Canada | Jan. 11, 1955 |

OTHER REFERENCES

Barthel et al.: "J. Am. Chem. Soc.," 77, 2424–2427 (1955).